United States Patent
Uchihashi et al.

(10) Patent No.: US 7,911,500 B2
(45) Date of Patent: Mar. 22, 2011

(54) IMAGE PROCESSING DEVICE, COMPUTER READABLE RECORDING MEDIUM, AND IMAGE PROCESSING METHOD

(75) Inventors: Shingo Uchihashi, Kanagawa (JP); Hiroyuki Miyake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 545 days.

(21) Appl. No.: 11/962,596

(22) Filed: Dec. 21, 2007

(65) Prior Publication Data
US 2009/0002510 A1 Jan. 1, 2009

(30) Foreign Application Priority Data
Jun. 28, 2007 (JP) .................. 2007-171263

(51) Int. Cl.
- *H04N 5/225* (2006.01)
- *H04N 9/04* (2006.01)
- *H04N 17/00* (2006.01)
- *H04N 17/02* (2006.01)

(52) U.S. Cl. .................. 348/207.99; 348/180; 348/181; 348/188

(58) Field of Classification Search ............. 348/207.99, 348/180–194
See application file for complete search history.

(56) References Cited

U.S. PATENT DOCUMENTS

| | | | |
|---|---|---|---|
| 2004/0070674 A1* | 4/2004 | Foote et al. ............. | 348/207.99 |
| 2004/0165154 A1 | 8/2004 | Kobori et al. | |
| 2005/0162409 A1* | 7/2005 | Hendriks et al. ............. | 345/173 |
| 2006/0023071 A1* | 2/2006 | Mori et al. ............. | 348/207.99 |
| 2006/0103825 A1* | 5/2006 | Kondo ............. | 355/55 |
| 2006/0181686 A1* | 8/2006 | Matsuda ............. | 353/69 |
| 2006/0181687 A1* | 8/2006 | Matsuda ............. | 353/69 |
| 2007/0040903 A1* | 2/2007 | Kawaguchi ............. | 348/14.08 |
| 2007/0273842 A1* | 11/2007 | Morrison et al. ............. | 353/97 |
| 2008/0018745 A1* | 1/2008 | Iyoda ............. | 348/207.99 |

FOREIGN PATENT DOCUMENTS

| | | |
|---|---|---|
| CN | 1523439 A | 8/2004 |
| JP | 2004109246 A | 4/2004 |
| JP | 2006004010 A | 1/2006 |

OTHER PUBLICATIONS

Chinese Office Action corresponding to Chinese patent Application No. 2008100030618, dated Dec. 1, 2010.

* cited by examiner

*Primary Examiner* — Sinh Tran
*Assistant Examiner* — Christopher K Peterson
(74) *Attorney, Agent, or Firm* — Sughrue Mion, PLLC

(57) ABSTRACT

An image processing device includes: a connecting unit that connects a projecting device and an image capture device, at least one of the projecting device and the image capture device having an adjustable position; an acquiring unit that acquires an image captured by the image capture device capturing an image of a reference pattern that is projected by the projecting device and indicates an effective projecting range of the projecting device; a color converting unit that extracts the reference pattern from the captured image, and performs a color conversion on the extracted reference pattern; an enlarging/reducing unit that enlarges or reduces the color-converted reference pattern in accordance with the ratio between the maximum effective imaging range of the image capture device and the effective projecting range of the projecting device; a superimposing unit that superimposes the enlarged or reduced reference pattern on a reference pattern yet to be projected; and an output unit that outputs the reference pattern superimposed by the superimposing unit to the projecting device.

14 Claims, 14 Drawing Sheets

IMAGE CAPTURED BY CAMERA

IMAGE PROJECTED BY PROJECTOR

FIG. 9A
FIG. 9B
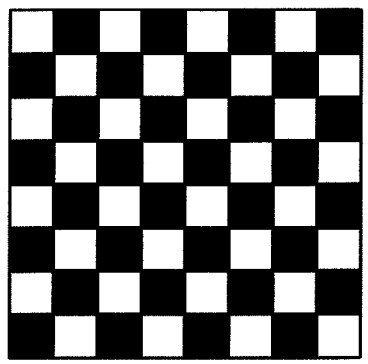
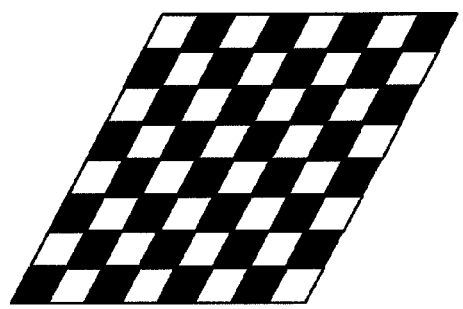

FIG. 13A
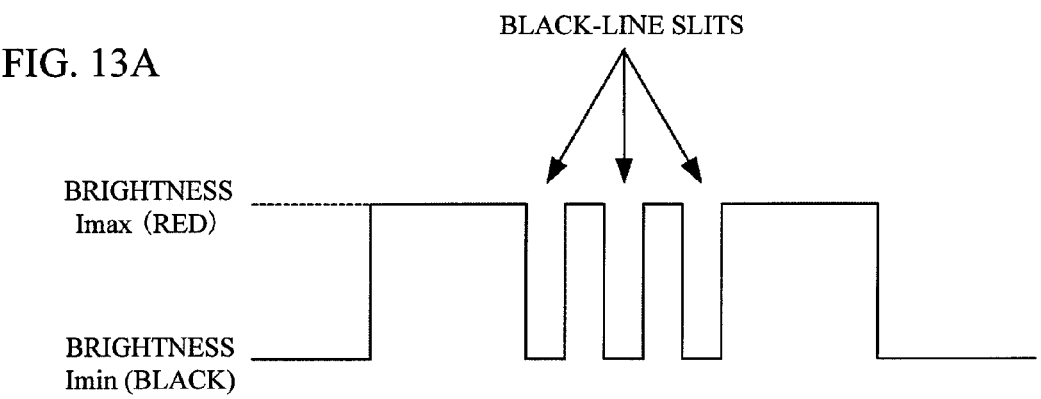
FIG. 13B
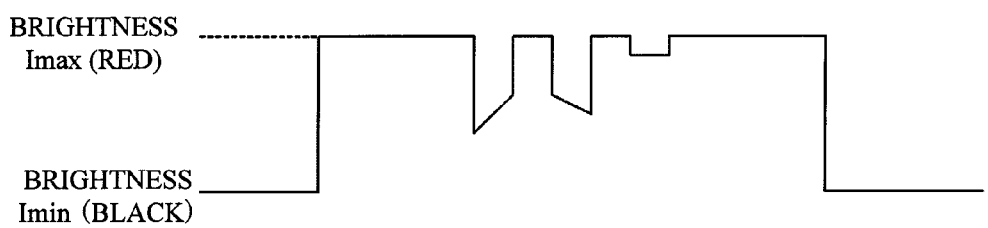
FIG. 13C
| FOCUS | 0.5 | 1 | 3 | 5 | 10 |
|---|---|---|---|---|---|
| CONTRAST VALUE | 0.3 | 0.4 | 0.8 | 0.7 | 0.1 |

IMAGE PROCESSING DEVICE, COMPUTER READABLE RECORDING MEDIUM, AND IMAGE PROCESSING METHOD

CROSS-REFERENCE TO RELATED APPLICATIONS

This application is based on and claims priority under 35 USC 119 from Japanese Patent Application No. 2007-171263 filed Jun. 28, 2007.

BACKGROUND

1. Technical Field

The present invention relates to an image processing device, a computer readable recording medium and an image processing method.

2. Related Art

There have been known image input/output devices that determine whether information written in an object to be imaged is the same as predetermined reference information, and project the information indicating the determination result with a projecting unit.

There are also known projector systems that can generate a correct image according to the state of a projection face.

Each of the image input/output devices and the projector systems includes an image capture device and a projecting device.

SUMMARY

According to an aspect of the invention, there is provided an image processing device that includes: a connecting unit that connects a projecting device and an image capture device, at least one of the projecting device and the image capture device having an adjustable position; an acquiring unit that acquires an image that can be captured by the image capture device capturing an image of a reference pattern that is projected by the projecting device and indicates an effective projecting range of the projecting device; a color converting unit that extracts the reference pattern from the captured image, and performs a color conversion on the extracted reference pattern; an enlarging/reducing unit that enlarges or reduces the color-converted reference pattern in accordance with the ratio between the maximum effective imaging range of the image capture device and the effective projecting range of the projecting device; a superimposing unit that superimposes the enlarged or reduced reference pattern on a reference pattern yet to be projected; and an output unit that outputs the reference pattern superimposed by the superimposing unit to the projecting device.

BRIEF DESCRIPTION OF THE DRAWINGS

Exemplary embodiments of the present invention will be described in detail based on the following figures, wherein:

FIG. 9A shows an example of a lattice pattern created by the reference pattern creating unit;

FIG. 9B shows an example of a captured image of the lattice pattern;

FIG. 13A is a graph showing the brightness of the slit portion in a case where the PTZ camera is focused on the projected image;

FIG. 13B is a graph showing the brightness of the slit portions in a case where the PTZ camera is not focused on the projected image;

FIG. 13C shows the relationship between the focus value of the PTZ camera and the contrast value.

DETAILED DESCRIPTION

The following is a description of exemplary embodiments of the present invention, with reference to the accompanying drawings.

First Exemplary Embodiment

Figure 1:
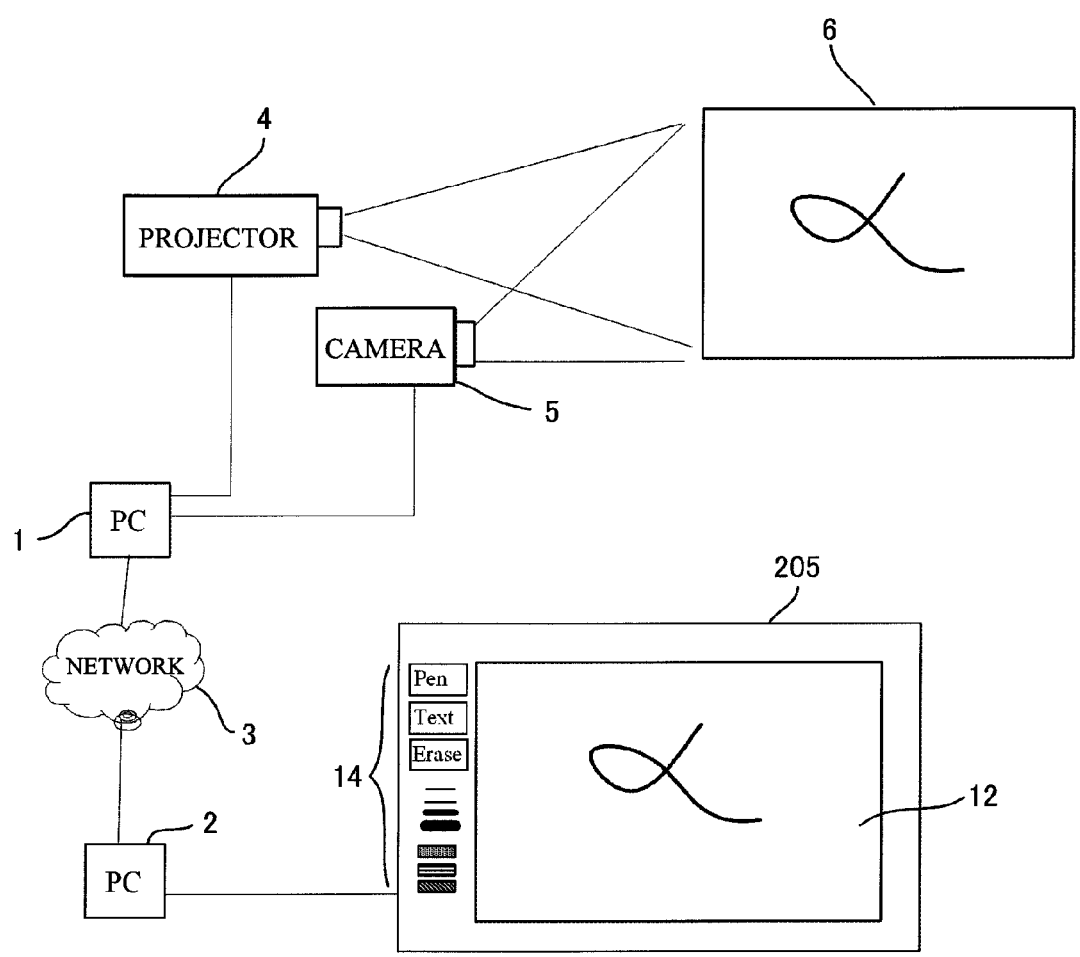
FIG. 1 is a block diagram showing the structure of a remote indicator system including a captured image converting device in accordance with a first exemplary embodiment of the present invention.

FIG. 1 is a block diagram showing the structure of a remote indicator system that includes a captured image converting device in accordance with a first exemplary embodiment of the present invention.

The remote indicator system of FIG. 1 includes a personal computer (PC) 1 that functions as a server, and a PC 2 that functions as a client. The PCs 1 and 2 are connected to each other via a network 3. A projector 4 (a projecting device) and a camera 5 (an image capture device) are connected to the PC 1.

In accordance with a control command from the PC 1, the projector 4 projects an annotation image onto a screen 6. The annotation image may be an image formed with lines, characters, symbols, or figures in various colors and fonts. The operator can move the projector 4 at will.

The camera 5 is a video camera or a PTZ (Pan Tilt Zoom) camera. The camera 5 captures an image of the screen 6, and outputs the captured image to the PC 1. The operator can move the camera 5 at will.

The PC 1 outputs the image captured by the camera 5 to the PC 2 via the network 3. The PC 2 is connected to a display 205. The display 205 displays a display area 12 of the captured image and a user interface (UI) 14. The PC 2 may be a personal computer formed integrally with the display 205.

The UI 14 includes buttons such as a "pen" button, a "text" button, and an "erase" button, and icons representing line types and color types. In FIG. 1, an image of the screen 6 captured by the camera 5 is displayed in the display area 12. For example, when a figure or the likes is written in the display area 12 by pressing the "pen" button of the UI 14, the information about the figure is output from the PC 2 to the projector 4 via the PC 1. Based on the information about the figure, the projector 4 draws a figure on the screen 6.

Although only the PC 2 is shown as a client in FIG. 1, the remote indicator system may include more than one client (PC).

Figure 2:
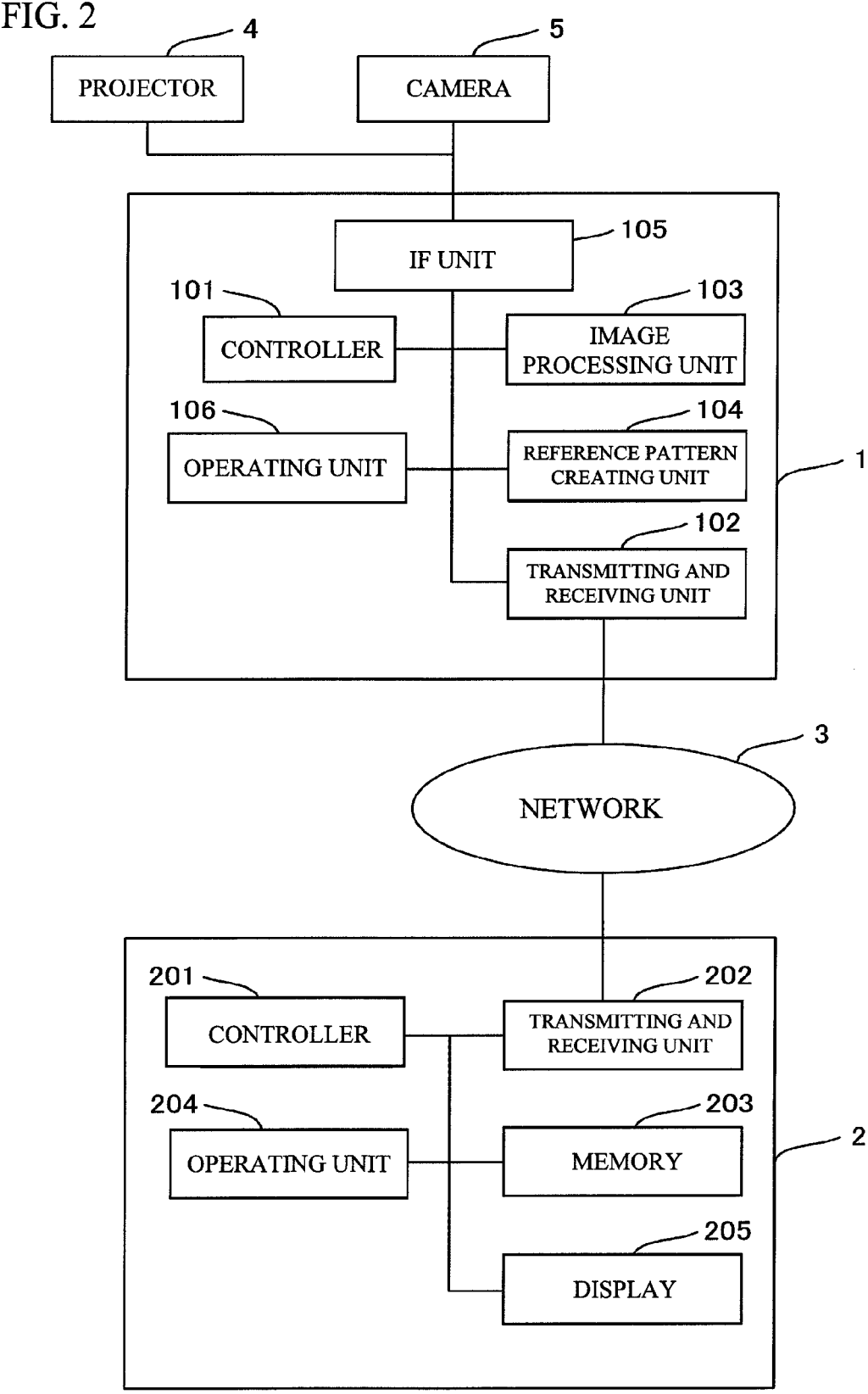
FIG. 2 is a block diagram showing the functional structures of PCs 1 and 2.

FIG. 2 is a block diagram showing the functional structures of the PCs 1 and 2.

The PC 1 includes: a controller 101 (the controller, the determining unit) that controls the entire apparatus and the operations of the projector 4 and the camera 5; a transmitting and receiving unit 102 that transmits and receives information and data to and from the PC 2 via the network 3; an image processing unit 103 (the acquiring unit, the color converting unit, the enlarging/reducing unit, the superimposing unit, the output unit, the deleting unit) that performs image processing on an image to be projected by the projector 4 and an image captured by the camera 5; a reference pattern creating unit 104 that creates a reference pattern to be projected by the projector 4; an interface (IF) unit 105 (the connecting unit) that connects the projector 4 and the camera 5; and an operating unit 106 that is formed with a mouse, a keyboard, and the likes. The controller 101 is connected to the transmitting and receiving unit 102, the image processing unit 103, the reference pattern creating unit 104, the IF unit 105, and the operating unit 106. The controller 101 is also connected to the projector 4 and the camera 5 via the IF unit 105.

The PC 2 includes: a controller 201 that controls the entire apparatus; a transmitting and receiving unit 202 that transmits and receives information and data to and from the PC 1 via the network 3; a memory 203 that stores a control program, data, information, and the likes; an operating unit 204 that is formed with a mouse, a keyboard, and the likes; and the display 205. The controller 201 is connected to the transmitting and receiving unit 202, the memory 203, the operating unit 204, and the display 205.

Figure 3:
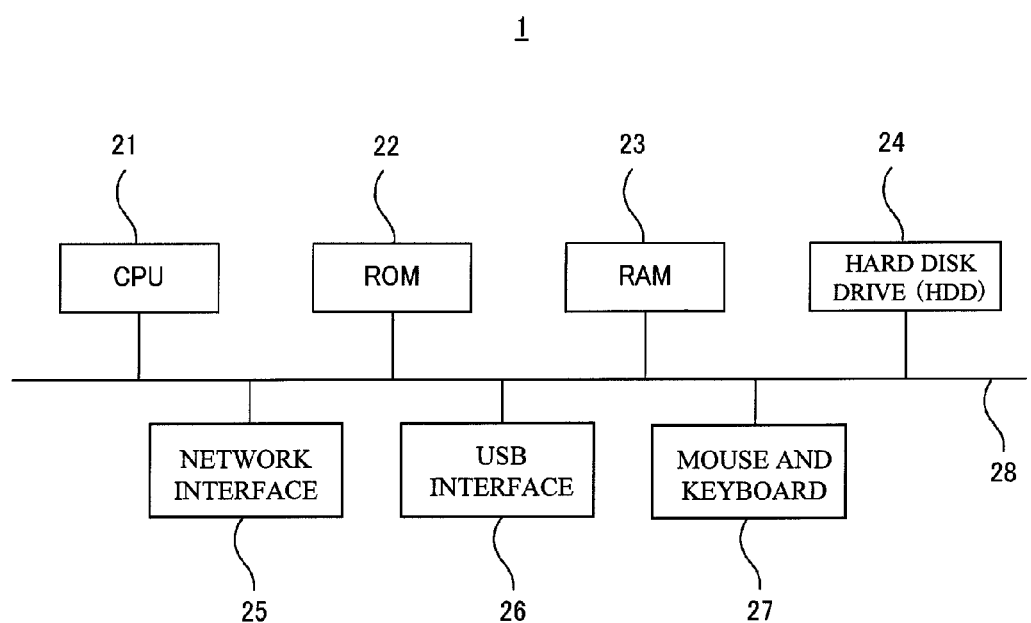
FIG. 3 is a block diagram showing the hardware structures of the PCs 1 and 2.

FIG. 3 is a block diagram showing the hardware structure of the PC 1.

The PC 1 includes: a CPU 21 that controls the entire apparatus; a ROM 22 that stores a control program; a RAM 23 that functions as a working area; a hard disk drive (HDD) 24 that stores various kinds of information and programs; a network interface 25 that establishes a connection with another computers; a USB (universal serial bus) interface 26 that establishes a connection with a USB device (not shown); and a mouse and keyboard 27. The CPU 21 is connected to the ROM 22, the RAM 23, the hard disk drive (HDD) 24, the network interface 25, the USB interface 26, and the mouse and keyboard 27.

The controller 101, the image processing unit 103, and the reference pattern creating unit 104 are equivalent to the CPU 21 that performs various operations in accordance with the control program. The transmitting and receiving unit 102 is equivalent to the network interface 25. The IF unit 105 is equivalent to the network interface 25.

The PC 2 has a mouse and keyboard and a display added to the same structure as the structure of the PC 1.

The method for transforming the coordinates of an image captured by the camera 5 into the coordinates of an image to be projected onto the projector 4 is now described.

Figure 4A:
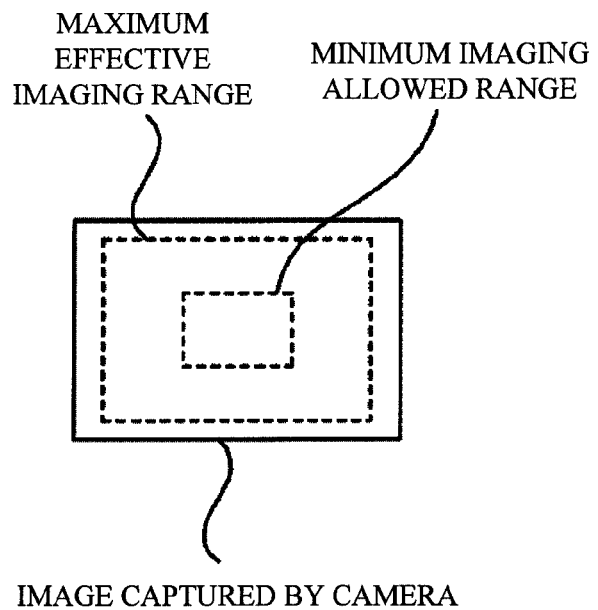
FIG. 4A shows the relationship between the maximum effective imaging range and a minimum imaging allowed range of the camera.

A coordinate transformation from a captured image to a projected image is performed by using the camera 5 capturing a pattern projected from the projector 4, and determining the relationship between each point in the projected pattern and each corresponding point in the captured image pattern. Also, to perform this calculation with high precision, the projected pattern needs to occupy a large area in the captured image and have relatively high resolution. More specifically, the camera 5 captures the projected pattern, so that the projected pattern falls within the maximum effective imaging range that is not affected by distortion or the like observed in the periphery of the captured image, and the projected pattern becomes larger than a minimum imaging allowed range that is a predetermined minimum imaging range captured by the camera 5 and is the lower limit for preventing a drop of the calculation accuracy in coordinate transformations. FIG. 4A shows the relationship between the maximum effective imaging range and the minimum imaging allowed range of the camera 5. The maximum effective imaging range and the minimum imaging allowed range are determined beforehand by the type of the camera. However, the user can change the settings of those ranges through the operating unit 106. The information about the maximum effective imaging range and the minimum imaging allowed range is stored in the HDD 24, when the camera 5 is connected to the PC 1.

Figure 4B:
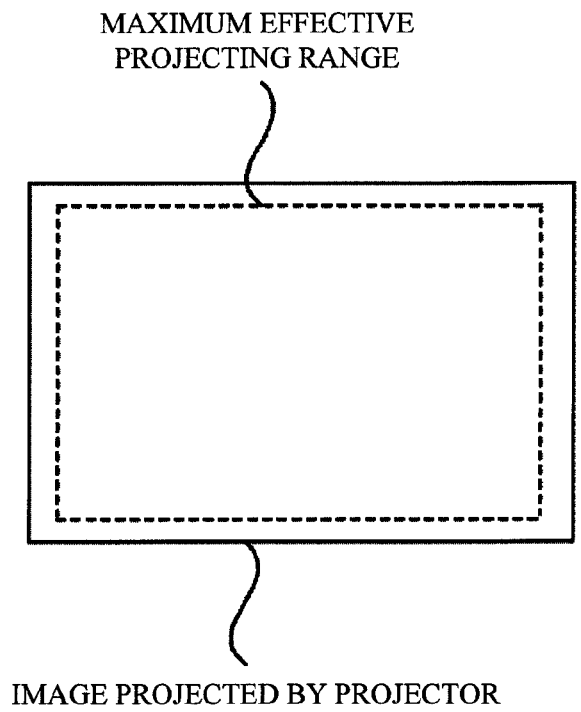
FIG. 4B shows an example of the maximum effective projecting range of the projector.

FIG. 4B shows the maximum effective projecting range of the projector 4. This maximum effective projecting range is set through the operating unit 106 by the user.

The maximum effective imaging range, the minimum imaging allowed range, and the maximum effective projecting range may be set through the operating unit 204 by a user of the PC 2 who is at a remote location.

Figure 5:
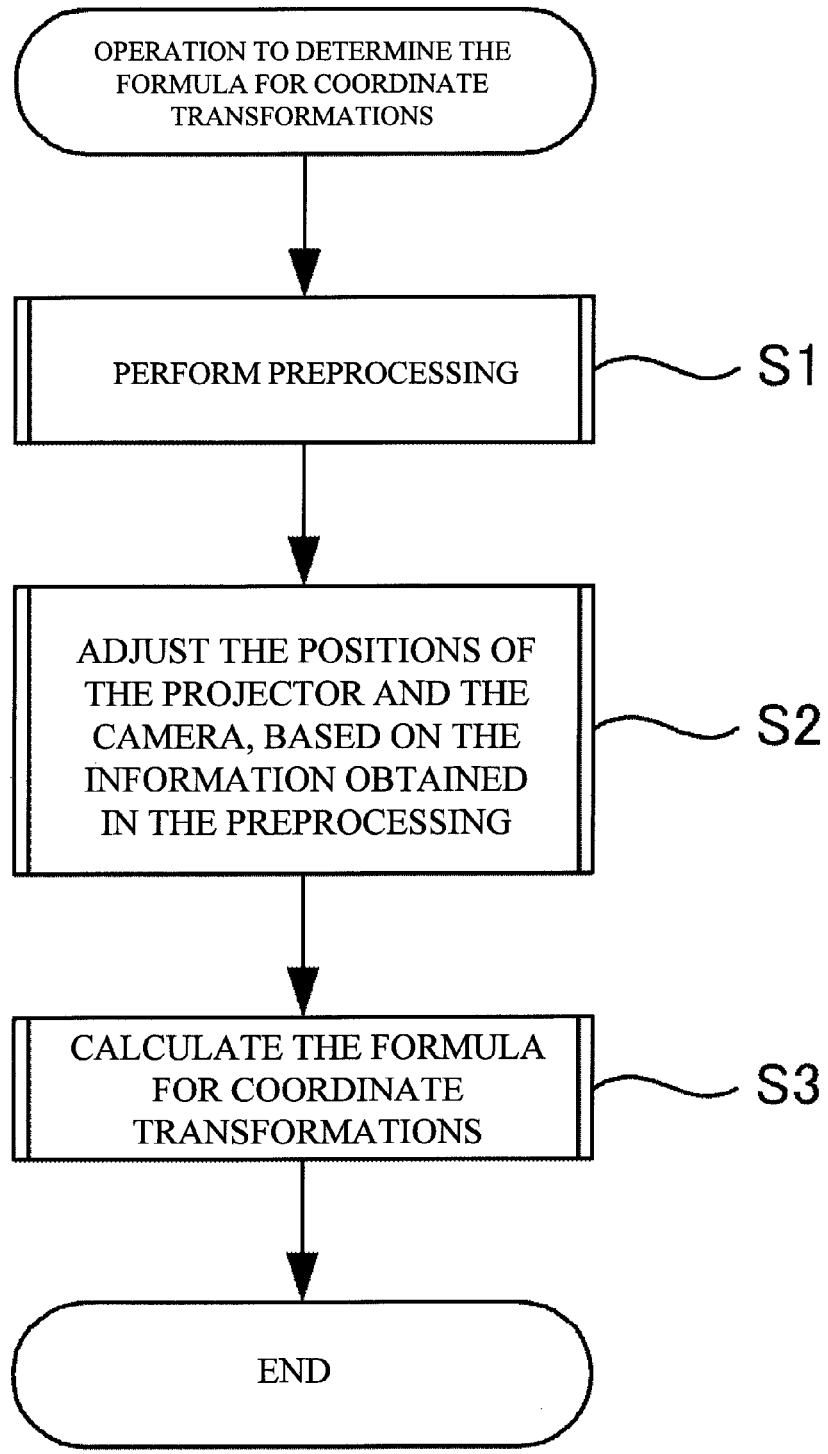
FIG. 5 is a flowchart showing an operation to be performed to determine the calculation formula for coordinate transformations.

FIG. 5 is a flowchart showing an operation to be performed to determine the calculation formula for coordinate transformations.

First, the PC 1 performs preprocessing so that the operator can adjust the positions of the projector 4 and the camera 5 (step S1).

After that, based on information obtained through the preprocessing, the operator adjusts the positions of the projector 4 and the camera 5 (step S2).

Lastly, the PC 1 calculates the calculation formula for a coordinate transformation to determine the relationship between the position of each point in the image projected by the projector 4 and the position of each corresponding point in the image obtained by the camera 5 capturing the image projected on the screen 6 (step S3). The PC 1 then ends this operation.

Figure 6:
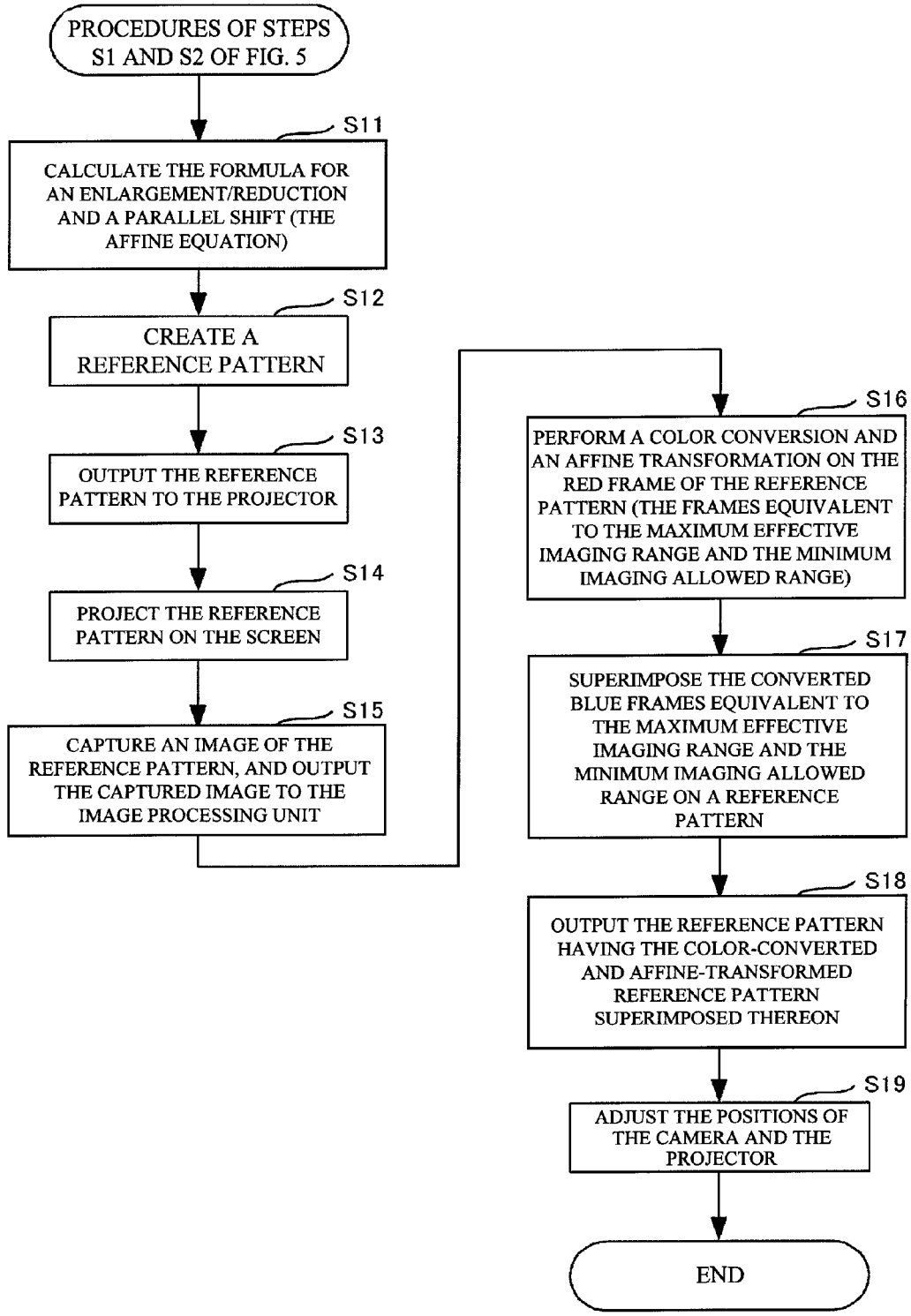
FIG. 6 is a flowchart showing more specific procedures to be carried out in steps S1 and S2 of FIG. 5.

FIG. 6 is a flowchart showing the procedures of steps S1 and S2 of FIG. 5 in greater detail.

First, the reference pattern creating unit 104 calculates such an equation (affine equation) of an enlargement/reduction and a parallel shift that the frame equivalent to the maximum effective imaging range of the camera 5 matches the frame of the maximum effective projecting range of the projector 4 in terms of size and location (step S11). This calculation is performed by a known calculation method.

Figure 7A:
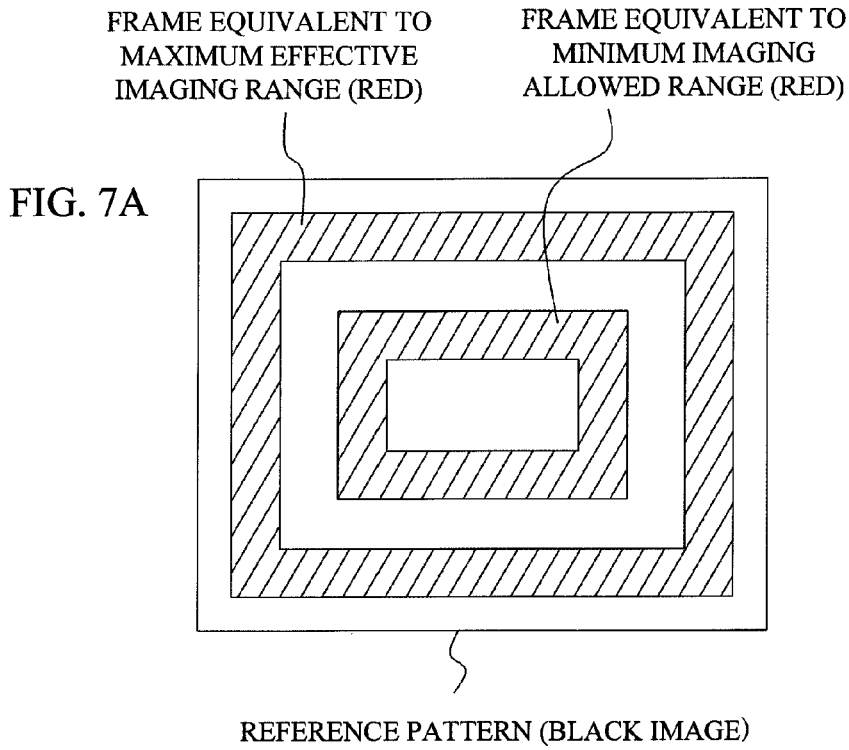
FIG. 7A shows an example of a reference pattern.

The reference pattern creating unit 104 prepares a black image that has the same size as the image projected by the projector 4. The reference pattern creating unit 104 then applies the affine equation to the frames equivalent to the maximum effective imaging range and the minimum imaging allowed range of the camera 5. The reference pattern creating unit 104 draws, in red, the frames equivalent to the converted maximum effective imaging range and minimum imaging allowed range on the black image (step S12). Hereinafter, the image obtained in step S12 will be referred to as the reference pattern. FIG. 7A shows an example of the reference pattern.

The reference pattern creating unit 104 then outputs the reference pattern to the projector 4 (step S13).

The projector 4 then projects the reference pattern onto the screen 6 (step S14). The camera 5 captures an image of the reference pattern projected on the screen 6, and outputs the captured reference pattern to the image processing unit 103 (step S15).

The image processing unit 103 acquires the captured reference pattern, and extracts the red frames of the reference pattern (the frames equivalent to the maximum effective imaging range and the minimum imaging allowed range). The image processing unit 103 then performs a color conversion to convert the red frames into blue, and applies the affine equation (an enlargement/reduction and a parallel shift) to the color-converted frames equivalent to the maximum effective imaging range and minimum imaging allowed range (step S16).

Figure 7B:
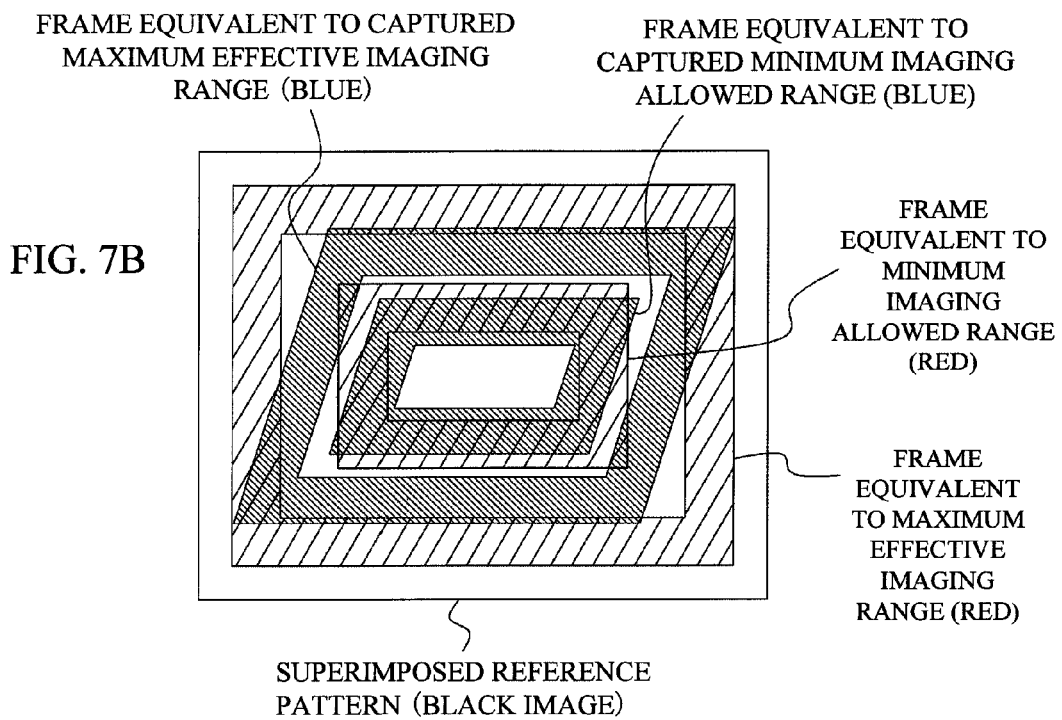
FIG. 7B shows an example of a reference pattern having the blue frames equivalent to the maximum effective imaging range and the minimum imaging allowed range superimposed thereon.

After that, the image processing unit 103 superimposes the blue frames equivalent to the affine-transformed maximum effective imaging range and minimum imaging allowed range on a reference pattern yet to be projected. The image processing unit 103 then outputs the superimposed reference pattern to the projector 4 (step S17). The projector 4 projects the superimposed reference pattern onto the screen 6 (step S18). FIG. 7B shows an example of the reference pattern on which the blue frames equivalent to the maximum effective imaging range and the minimum imaging allowed range are superimposed. The procedures of steps S11 through S18 are equivalent to step S1 of FIG. 5, and the procedure of step S19 described below is equivalent to step S2 of FIG. 5.

Looking at the reference pattern that is projected on the screen 6 and has the blue frames of the maximum effective imaging range and the minimum imaging allowed range superimposed thereon, the operator of the projector 4 and the camera 5 adjusts the position of the projector 4 so that the red frames equivalent to the maximum effective imaging range and the minimum imaging allowed range of the reference pattern appear to have rectangular shapes, and also adjusts the position of the camera 5 so that the blue frame equivalent to the maximum effective imaging range falls between the red frame equivalent to the maximum effective imaging range and the red frame equivalent to the minimum imaging allowed range (step S19). This operation then comes to an end. At this point, under the condition that the blue frame equivalent to the maximum effective imaging range falls between the red frame equivalent to the maximum effective imaging range and the red frame equivalent to the minimum imaging allowed range, the adjustment should be performed so that the blue frame equivalent to the maximum effective imaging range becomes as large as possible. By doing so, the relationship between each point in the captured image and each corresponding point in the projected image can be determined with high precision.

In step S19, the operator of the camera 5 may further adjust the field angle of the camera 5. In a case where the projector 4 has the function of correcting distortion of the projected image, the operator of the projector 4 may further correct the distortion of the projected image. In a case where there is a desired range within which projection and image capture are to be performed on the screen 6, the operator of the projector 4 adjusts the position of the projector 4 so that the projected red frame equivalent to the maximum effective imaging range surrounds the desired range.

If the projector 4 or the camera 5 is being adjusted in step S21, the procedures of steps S14 through S18 are repeated. Therefore, if the projector 4 or the camera 5 is being adjusted, the reference pattern having the blue frames equivalent to the maximum effective imaging range and the minimum imaging allowed range superimposed thereon might be again converted into blue frames and superimposed on a new reference pattern.

To prevent such a situation, if the projector 4 or the camera 5 is being adjusted, the image processing unit 103 performs filtering so that only the red portion is extracted from the reference pattern having the blue frames equivalent to the maximum effective imaging range and the minimum imaging allowed range, or performs filtering so that the blue frames equivalent to the maximum effective imaging range and the minimum imaging allowed range are deleted. In this manner, the red frames equivalent to the maximum effective imaging range and the minimum imaging allowed range are converted into blue frames and superimposed on a new reference pattern. It is also possible to attach a filtering lens for transmitting only the red portions to the camera 5 while the projector 4 or the camera 5 is being adjusted.

Figure 8:
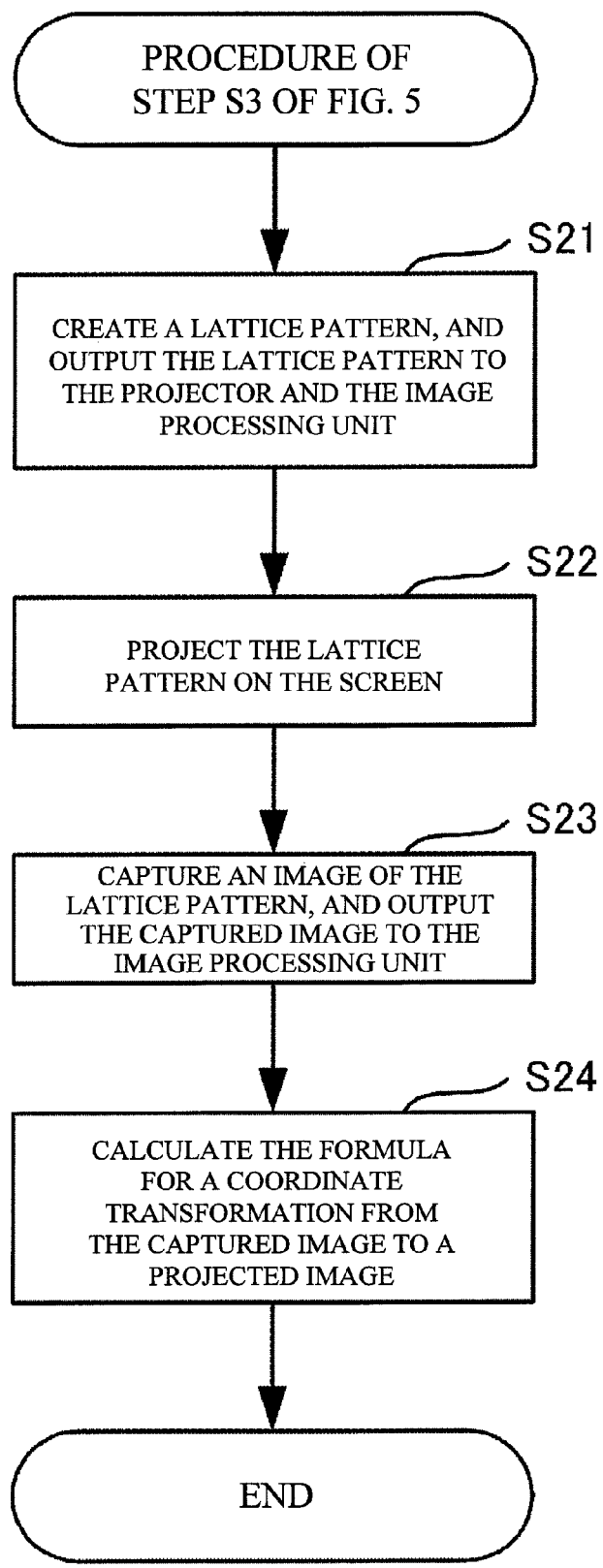
FIG. 8 is a flowchart showing a more specific procedure to be carried out in step S3 of FIG. 5.

FIG. 8 is a flowchart showing the procedure of step S3 of FIG. 5 in greater detail.

First, the reference pattern creating unit 104 divides each black image and each white image stored in the HDD 24 into eight portions, so as to produce a lattice pattern shown in FIG. 9A. The reference pattern creating unit 104 then outputs the lattice pattern to the projector 4 and the image processing unit 103 (step S21). The size of the lattice pattern is equivalent to the maximum effective projecting range of the projector 4.

The projector 4 projects the lattice pattern onto the screen 6 (step S22). The camera 5 captures an image of the lattice pattern projected on the screen 6, and outputs the captured image to the image processing unit 103 (step S23). FIG. 9B shows an example of the captured image of the lattice pattern.

Based on the relationship between the positions of four or more lattice points in the captured lattice pattern and the positions of four or more lattice points in the lattice pattern obtained from the reference pattern creating unit 104, the image processing unit 103 calculates the calculation formula for a coordinate transformation from the captured image to a projected image (step S24). This operation then comes to an end. The calculation formula for a coordinate transformation from the captured image to a projected image is stored in the HDD 24. When the captured image is projected onto the screen 6, the controller 101 reads, from the HDD 24, the calculation formula for a coordinate transformation from the captured image to a projected image, and uses the calculation formula.

As described above in detail, in accordance with this exemplary embodiment, the image processing unit 103 obtains an image captured by the camera 5 capturing the image of the reference pattern that is projected by the projector 4 and indicates the effective projecting range of the projector 4 and the maximum effective imaging range of the camera 5. The image processing unit 103 performs a color conversion on the reference pattern in the captured image. In accordance with the ratio between the maximum effective imaging range of the camera 5 and the effective projecting range of the projector 4, the image processing unit 103 enlarges or reduces the color-converted reference pattern. The image processing unit 103 then superimposes the enlarged or reduced reference pattern on a reference pattern yet to be projected, and outputs the superimposed reference pattern to the projector 4. Accordingly, the operator of the camera 5 and the projector 4 can recognize the positional relationship between the camera 5 and the projector 4, based on the image projected by the projector 4.

In a case where at least one of the camera 5 and the projector 4 is being adjusted, the image processing unit 103 performs filtering so that the color-converted and enlarged/reduced reference pattern is deleted from the superimposed reference pattern. In this manner, the color-converted and enlarged/reduced reference pattern cannot be again color-converted and enlarged/reduced, and be superimposed on a new reference pattern. If the camera 5 is equipped with a filtering lens for deleting the color-converted and enlarged/reduced reference pattern from the superimposed reference pattern, the same effect as above is expected.

Second Exemplary Embodiment

Figure 10:
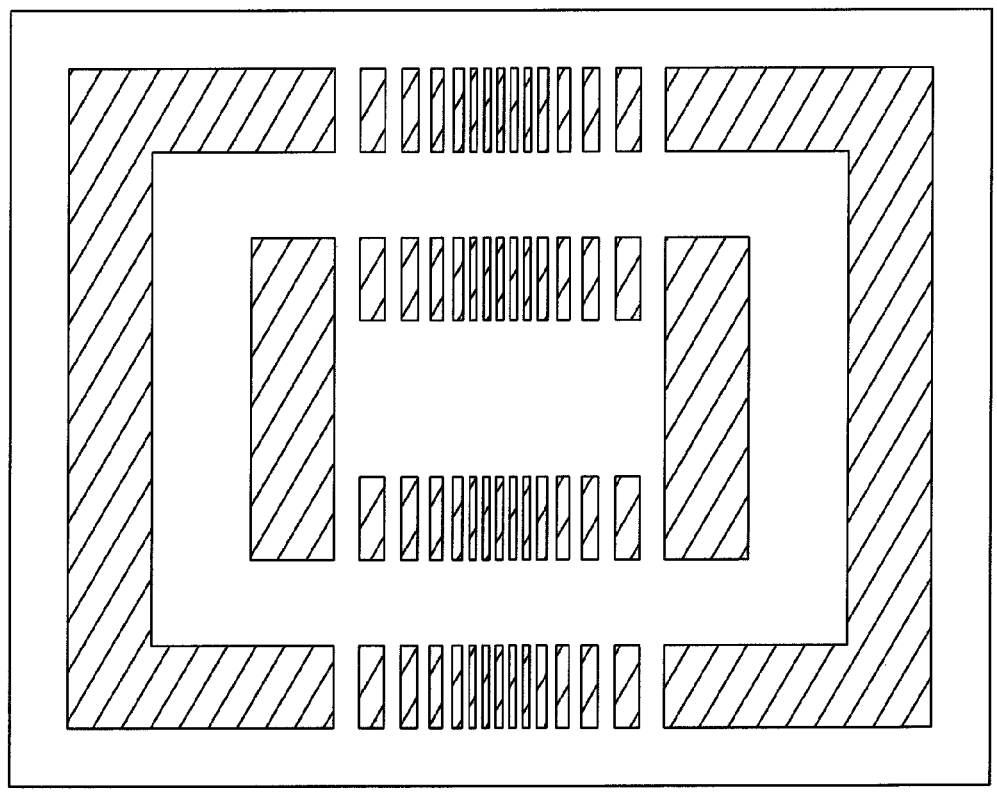
FIG. 10 shows a modification of the reference pattern of FIG. 7A in accordance with a second exemplary embodiment.

FIG. 10 shows a modification of the reference pattern shown in FIG. 7A.

As shown in FIG. 10, black-line slits are formed at one-pixel intervals, two-pixel intervals, and four pixel intervals in the red frames equivalent to the maximum effective imaging range and the minimum imaging allowed range.

Through the same procedures as the procedures of steps S14 through S18 of FIG. 6, this reference pattern is superimposed on a color-converted and affine-transformed reference pattern, and is then projected on the screen 6 by the projector 4.

Accordingly, looking at the black-line slits formed in the frames projected in blue, the operator of the camera 5 can adjust the focus of the camera 5. If the black-line slits are projected clearly on the screen, the operator of the camera 5 can recognize that the camera 5 is focused on the projected image. If the black-line slits are not clearly projected on the screen, the operator of the camera 5 can recognize that the camera 5 is not focused on the projected image. The operator of the camera 5 adjusts the focus of the camera 5, so that all the slits with different widths are clearly projected on the screen. In this manner, the camera 5 can be focused on the projected image with high precision. With this reference pattern, equipment such as a monitor for monitoring the imaging condition of the camera 5 becomes unnecessary.

Looking at the black-line slits formed in the frames projected in red, the operator of the projector 4 can adjust the focus of the projector 4. The operator of the projector 4 adjusts the focus of the projector 4, so that all the slits with different widths are clearly projected on the screen. In this manner, the projector 4 can be focused on the projected image with high precision.

The shape of each of the red frame equivalent to the maximum effective imaging range and the minimum imaging allowed range is not limited to a rectangular shape. For example, each red frame may have a rectangular shape with four round corners. The black-line slits may be formed at least one side of each of the frames equivalent to the maximum effective imaging range and the minimum imaging allowed range. The number of slits may be one or more.

In FIG. 10, the black-line slits are formed at intervals that become wider toward the outside, with the narrowest interval being located at the center of at least one side of each of the frames equivalent to the maximum effective imaging range and the minimum imaging allowed range. However, the black-line slits may be formed at intervals that become narrower toward the outside, with the widest interval being located at the center of at least one side of each of the frames equivalent to the maximum effective imaging range and the minimum imaging allowed range. In this case, the camera 5 can be focused on the projected image with higher precision than in a case where slits are formed at regular intervals.

Also, the black-line slits may be formed at irregular intervals, with the center point of the intervals being located at the center of at least one side of each of the frames equivalent to the maximum effective imaging range and the minimum imaging allowed range. In this case, the camera 5 can also be focused on the projected image with higher precision than in a case where slits are formed at regular intervals.

As described above, in accordance with this exemplary embodiment, slits are formed in the reference pattern. Thus, the operator of the projector 4 and the camera 5 can adjust the focus of each of the projector 4 and the camera 5, looking at the slits projected on the screen by the projector 4.

In a case where two or more slits are formed in the reference pattern, the focus of the projector 4 and the focus of the camera 5 can be adjusted with higher precision.

In cases where two or more slits are formed at intervals that become wider or narrower toward the outside or at irregular intervals, with the center point of the intervals being located at the center of at least one side of the reference pattern, the focus of the projector 4 and the focus of the camera 5 can be adjusted with higher precision than in cases where slits are formed at regular intervals.

Third Exemplary Embodiment

In this exemplary embodiment, the above-described adjustment of the camera 5 performed by the operator of the camera 5 in step S19 is carried out by the PC 1.

In this exemplary embodiment, a PTZ (Pan Tilt Zoom) camera is used as the camera 5. A PTZ camera can change the orientation of the camera in the vertical and horizontal directions, and can adjust the zoom factor of the camera. The adjustment of the orientation and zoom factor of the PTZ camera is performed in accordance with a control signal from the controller 101.

Figure 11:
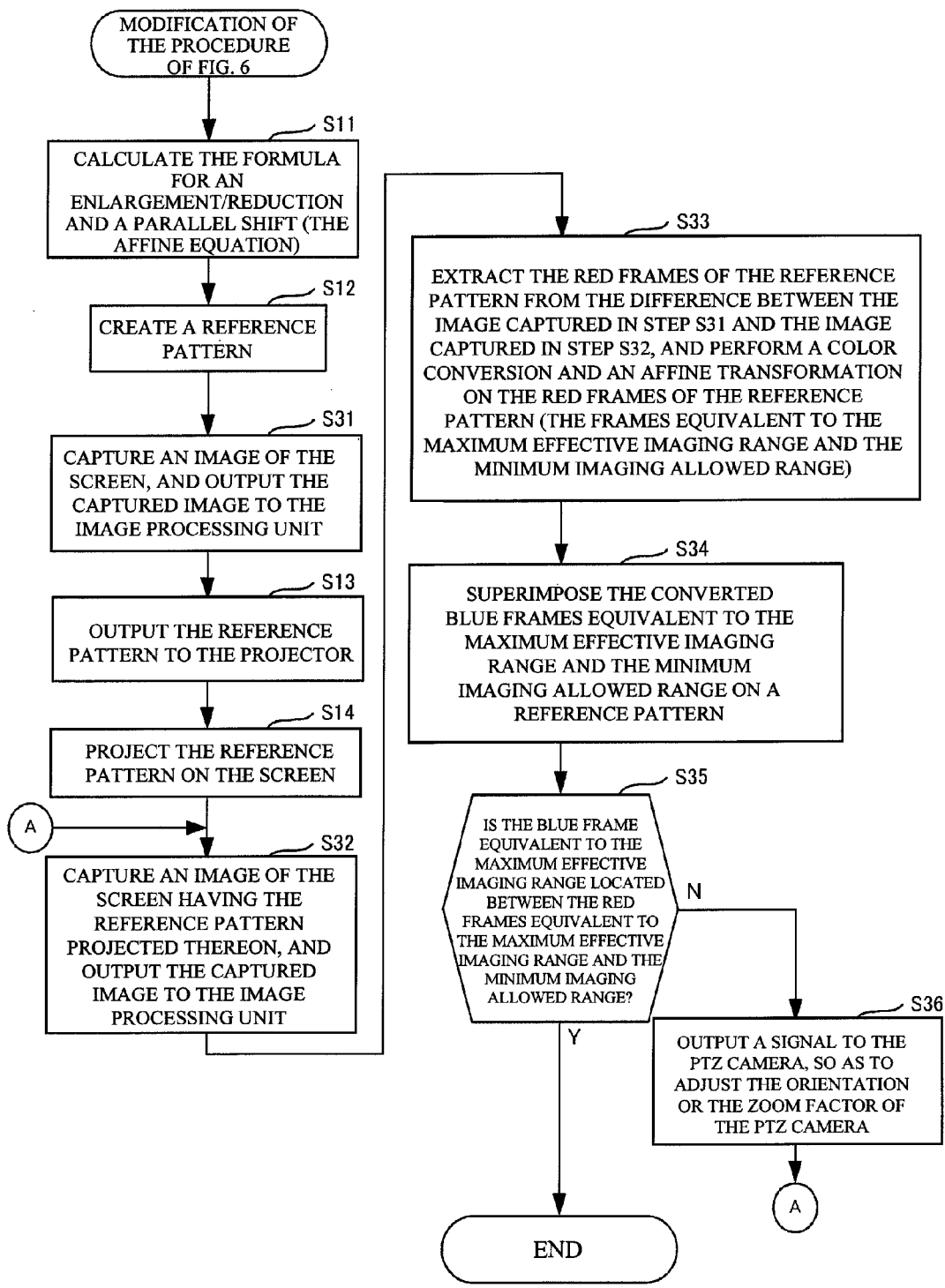
FIG. 11 is a flowchart showing a modification of the flowchart of FIG. 6 in accordance with a third exemplary embodiment.

FIG. 11 is a flowchart that is a modification of the flowchart of FIG. 6. The same procedures as those in FIG. 6 are denoted by the same reference numerals as in FIG. 6, and explanation of them is omitted here.

After the procedure of step S12 is carried out, the PTZ camera captures an image of the screen 6 under the control of the controller 101, and outputs the captured image to the image processing unit 103 (step S31). The operation then moves on to step S13.

After the procedure of step S14 is carried out, the PTZ camera captures an image of the screen 6 on which the reference pattern is projected under the control of the controller 101. The PTZ camera then outputs the captured image to the image processing unit 103 (step S32).

Although capturing the image of the screen 6 in steps S31 and S32, the PTZ camera may not capture an image of the space surrounding the screen 6. However, it is necessary to capture a larger image of the screen 6 than the minimum imaging allowed range of the PTZ camera.

The image processing unit 103 extracts the red frames of the reference pattern (the frames equivalent to the maximum effective imaging range and the minimum imaging allowed range) from the difference between the image captured in step S31 and the image captured in step S32. The image processing unit 103 then performs a color conversion to convert the red frames into blue frames, and applies the above-described affine equation (an enlargement/reduction and a parallel shift)

to the color-converted frames equivalent to the maximum effective imaging range and the minimum imaging allowed range (step S33).

After that, the image processing unit 103 superimposes the affine-transformed blue frames equivalent to the maximum effective imaging range and the minimum imaging allowed range on the reference pattern (step S34).

The controller 101 then determines whether the blue frame equivalent to the maximum effective imaging range falls between the red frame equivalent to the maximum effective imaging range and the red frame equivalent to the minimum imaging allowed range (step S35).

If "YES" in step S35, this operation comes to an end. If "NO" in step S35, the controller 101 outputs a signal to the PTZ camera (step S36). This signal indicates the orientation and zoom factor of the PTZ camera with which the blue frame equivalent to the maximum effective imaging range falls between the red frame equivalent to the maximum effective imaging range and the red frame equivalent to the minimum imaging allowed range. The operation then moves on to step S32.

Through this operation, the orientation and zoom factor of the PTZ camera can be automatically adjusted so that the frame equivalent to the maximum effective imaging range of the captured reference pattern falls between the frame equivalent to the maximum effective imaging range of the original reference pattern and the frame equivalent to the minimum imaging allowed range of the original reference pattern.

Figure 12:
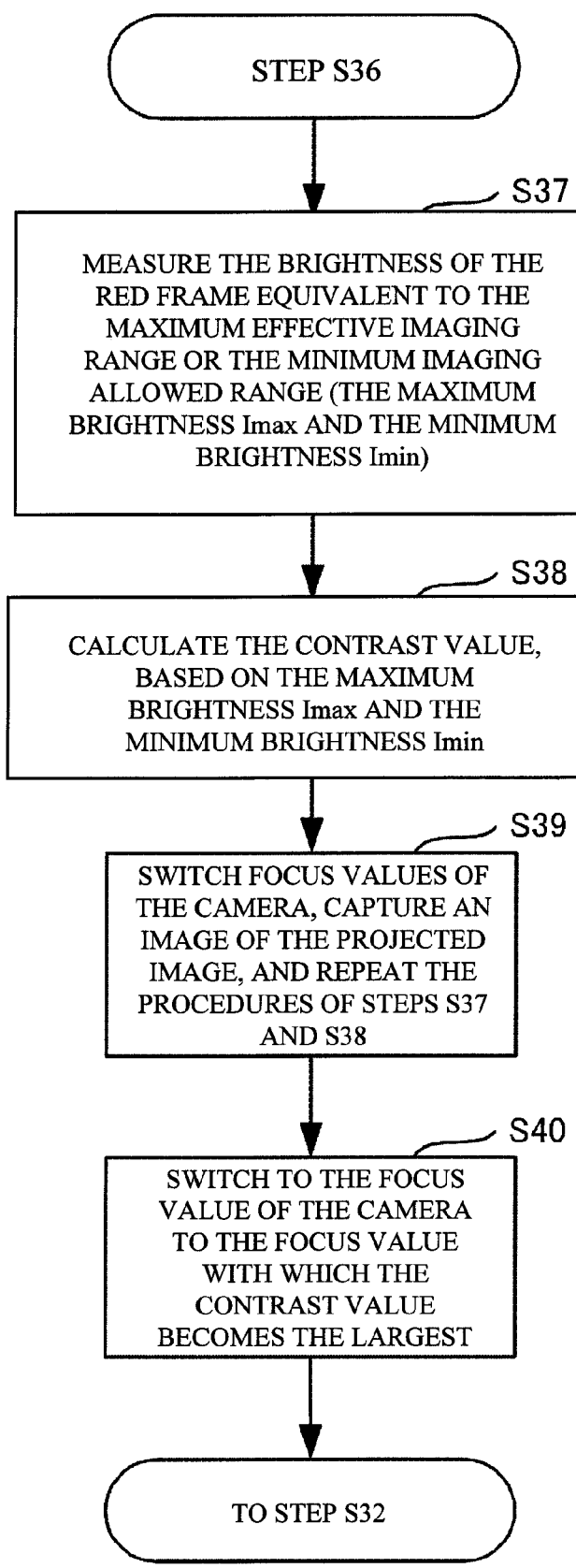
FIG. 12 is a flowchart showing an example of procedures to be added to the flowchart of FIG. 11.

In a case where the PTZ camera has a focus adjustment function, a reference pattern having the slits of FIG. 10 formed therein is used, so as to adjust the orientation, focus, and zoom factor of the PTZ camera. In this case, the procedures shown in FIG. 12 are added to the flowchart of FIG. 11.

More specifically, after the procedure of step S36 is carried out, the controller 101 measures the brightness of the red frames equivalent to the maximum effective imaging range and the minimum imaging allowed range (the maximum brightness Imax and the minimum brightness Imin) (step S37).

FIGS. 13A and 13B are graphs showing the brightness of the slit portions. FIG. 13A illustrates a case where the PTZ camera is focused on a projected image. FIG. 13B illustrates a case where the PTZ camera is not focused on the projected image. In the case where the PTZ camera is focused on the projected image as in the case shown in FIG. 13A, the brightness at each of the black-line slits is the minimum brightness Imin, and the brightness of the red frames is the maximum brightness Imax. On the other hand, in the case where the PTZ camera is not focused on the projected image as in the case shown in FIG. 13B, the black-line slits are blurred, and the minimum brightness Imin of each of the black-line slits exhibits a higher value than in the case illustrated in FIG. 13A.

Based on the measured maximum brightness Imax and minimum brightness Imin, the controller 101 calculates the contrast value (=(Imax−Imin)/(Imax+Imin)) (step S38). Although the controller 101 calculates the normalized value of the maximum brightness Imax and minimum brightness Imin in this exemplary embodiment, the contrast value may be the difference between the measured maximum brightness Imax and the measured minimum brightness Imin.

The contrast value is higher in the case where the PTZ camera is focused on the projected image. The controller 101 switches the values representing the focus of the PTZ camera. The controller 101 then captures the projected image, and repeats the procedures of steps S37 and S38 (step S39).

The controller 101 switches the PTZ camera to the focus value with which the contrast value becomes the largest (step S40), and moves on to step S32. FIG. 13C shows the relationship between the focus value of the PTZ camera and the contrast value. In FIG. 13C, the controller 101 sets the focus value of the PTZ camera at $3m$.

Through the procedures of steps S37 through S40, the focus of the PTZ camera can be automatically adjusted.

As described above in detail, in accordance with this exemplary embodiment, the controller 101 controls at least one of the orientation, zoom, and focus of the PTZ camera. Accordingly, a projected reference pattern can be precisely captured by the PTZ camera.

Also, based on the reference pattern superimposed by the image processing unit 103, the controller 101 determines whether the maximum effective imaging range of the image capture device indicated in the enlarged/reduced reference pattern falls between the maximum effective imaging range and the minimum imaging allowed range indicated in a reference pattern yet to be projected (step S35). If "NO" in step S35, the controller 101 controls the direction or zoom factor of the image capture device, so that the maximum effective imaging range of the image capture device indicated in the enlarged/reduced reference pattern falls between the maximum effective imaging range and the minimum imaging allowed range of the image capture device indicated in a reference pattern yet to be projected. Accordingly, the controller 101 can perform a preliminary operation (preprocessing) to determine the formula for coordinate-transforming a captured image into a projected image. In other words, the controller 101 can perform a preliminary operation to determine the relationship between each point in the projected image and each corresponding point in the captured image.

Further, the controller 101 adjusts the focus of the PTZ camera to the focus value with which the difference between the brightness of the slits portions and the brightness of the other portions in the frame equivalent to the maximum effective imaging range or the minimum imaging allowed range of the PTZ camera becomes largest among reference patterns projected by the PTZ camera with two or more focus values. Accordingly, the focus of the image capture device can be automatically adjusted to the focus value with which the projected image has the slit portions clearly projected.

Fourth Exemplary Embodiment

Figure 14:
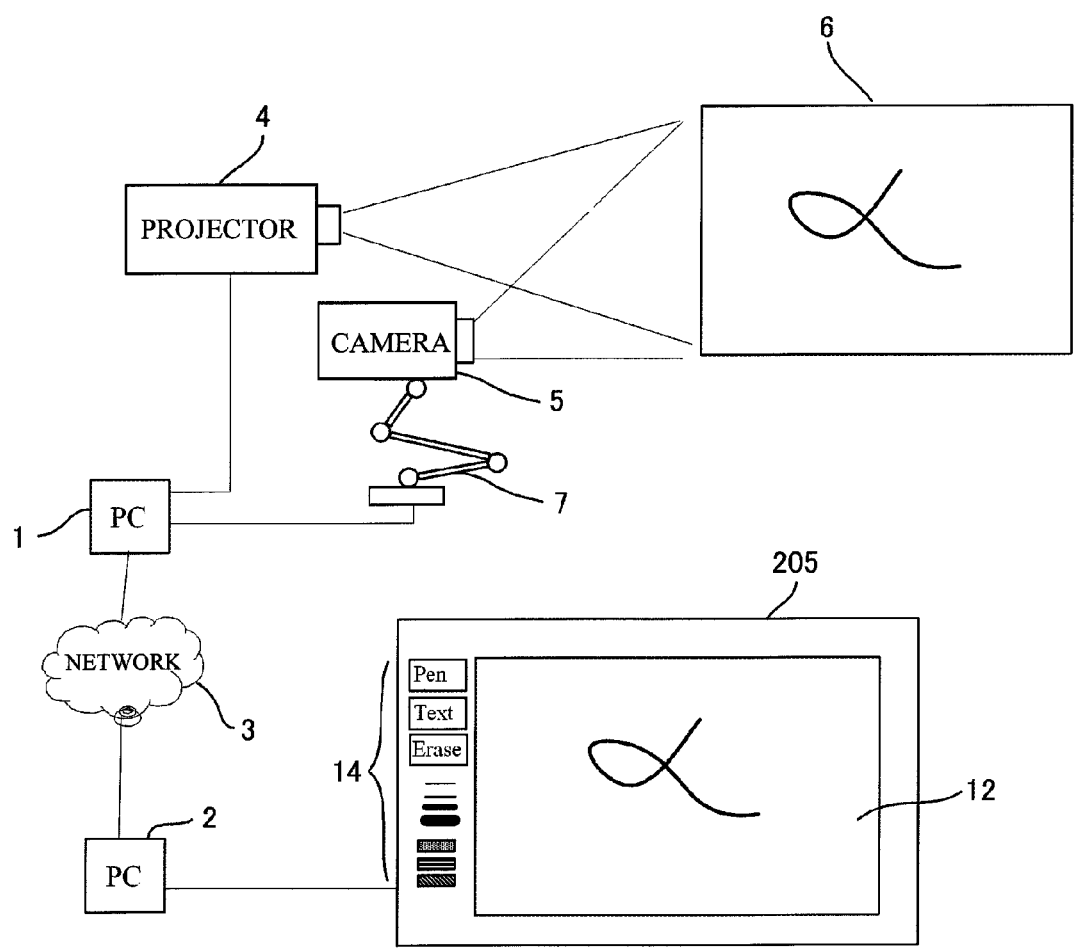
FIG. 14 is a block diagram showing the structure of a remote indicator system including a captured image converting device in accordance with a fourth exemplary embodiment.

In this exemplary embodiment, a robot arm 7 (the moving unit) for moving the camera 5 is connected to the camera 5, as shown in FIG. 14. The movement of the robot arm 7 is controlled by the controller 101. The camera 5 may be a video camera or a PTZ camera.

In this exemplary embodiment, the same procedures as those in the flowchart of FIG. 11 are carried out, except for the procedure of step S36.

In a case where the blue frame equivalent to the maximum effective imaging range does not fall between the red frame equivalent to the maximum effective imaging range and the red frame equivalent to the minimum imaging allowed range (or in the case of "NO" in step S35), the controller 101 outputs a signal to the robot arm 7. With this signal, the robot arm 7 moves in such a manner that the blue frame equivalent to the maximum effective imaging range falls between the red frame equivalent to the maximum effective imaging range and the red frame equivalent to the minimum imaging allowed range. The operation then moves on to step S32.

In accordance with this exemplary embodiment, the controller 101 controls the position of the camera 5 being moved by the robot arm 7. Thus, the position of the camera 5 can be adjusted with a higher degree of freedom than in the third exemplary embodiment.

In the first through fourth exemplary embodiments, the camera 5 captures an image including the image projected by the projector 4. Accordingly, when the captured image is displayed on the display 205 of the PC 2, the information about the maximum effective projecting range of the projector 4 may be superimposed on the captured image by the display 205 of the PC 2. If the information about the maximum effective projecting range of the projector 4 is held in the PC 1, the information is transmitted to the controller 201 of the PC 2. In this manner, the user of the PC 2 can recognize that the annotation image written in the maximum effective projecting range displayed on the display 205 is transmitted to the user on the side of the projector 4.

Also, the image processing unit 103 may superimpose the information about the maximum effective imaging range of the camera 5 (or the outer red frame) on the image to be projected by the projector 4, and output the superimposed image to the projector 4. By doing so, the information about the maximum effective imaging range of the camera 5 is projected, and the user on the side of the projector 4 can recognize that the information written in the maximum effective imaging range of the camera 5 is transmitted to the user of the PC 2.

A recording medium on which the software programs for realizing the functions of the PC 1 is recorded may be supplied to the PC 1. The CPU of the PC 1 then reads and executes the programs recorded on the recording medium, so as to achieve the same effects as those of the first through fourth exemplary embodiments. The recording medium for supplying programs may be a CD-ROM, a DVD, a SD card, or the like.

Also, the CPU of the PC 1 may execute software programs, so as to achieve the same effects as those of the first through fourth exemplary embodiments.

It should be understood that the present invention is not limited to the above-described first through fourth exemplary embodiments, and various modifications may be made to them without departing from the scope of the invention.

What is claimed is:

1. An image processing device comprising:
 a connecting unit that connects a projecting device and an image capture device, at least one of the projecting device and the image capture device having an adjustable position;
 an acquiring unit that acquires an image captured by the image capture device, the image captured by the image capture device being an image of a first reference pattern that is projected by the projecting device, the first reference pattern indicating an effective projecting range of the projecting device;
 a color converting unit that extracts the first reference pattern from the acquired image, and performs a color conversion on the extracted first reference pattern, the color conversion converting frames of the first reference pattern from a first color to a second color;
 an enlarging/reducing unit that changes a size of the color-converted first reference pattern based on a ratio between a maximum effective imaging range of the image capture device and the effective projecting range of the projecting device, the color-converted first reference pattern having the changed size being a second reference pattern; and
 an output unit that outputs the first reference pattern and the second reference pattern, the second reference pattern superimposed on the first reference pattern.

2. The image processing device according to claim 1, further comprising a deleting unit that deletes the second reference pattern superimposed on the first reference pattern, in response to a position of at least one of the projecting device and the image capture device being adjusted.

3. The image processing device according to claim 1, wherein the image capture device includes a deleting unit that deletes the second reference pattern superimposed on the first reference pattern, in response to a position at least one of the projecting device and the image capture device being adjusted.

4. The image processing device according to claim 1, wherein a slit portion is formed in the reference pattern.

5. The image processing device according to claim 4, wherein a plurality of slits are formed in the slit portion.

6. The image processing device according to claim 5, wherein the plurality of slits are formed at intervals that become wider or narrower toward the outside or at irregular intervals, with the center of the slits being located at the center of at least one side of the reference pattern.

7. The image processing device according to claim 1, further comprising a controller that controls at least one of an orientation, zoom factor, focus of the image capture device.

8. The image processing device according to claim 7, wherein:
 the reference pattern indicates a predetermined minimum imaging range captured by the image capture device
 the image processing device further comprises a determining unit that determines, based on the second reference pattern, whether the maximum effective imaging range of the image capture device indicated in the second reference pattern is located between the maximum effective imaging range and the predetermined minimum imaging range indicated in the first reference pattern; and
 when the maximum effective imaging range of the image capture device indicated in the second reference pattern is not located between the maximum effective imaging range and the predetermined minimum imaging range indicated in the first reference pattern, the controller controls at least one of an orientation or a zoom factor of the image capture device, so that the maximum effective imaging range of the image capture device indicated in the second reference pattern falls between the maximum effective imaging range and the predetermined minimum imaging range indicated in the first reference pattern.

9. The image processing device according to claim 7, wherein:
 a slit portion is formed in a frame equivalent to the maximum effective imaging range or the predetermined minimum imaging range indicated in the first reference pattern;
 the image capture device captures a plurality of images of the first reference pattern projected by the projecting device with a plurality of focus values; and
 the controller adjusts the focus of the image capture device to the focus value with which a difference between a brightness of the slit portion and a brightness of a non-slit portion in the frame equivalent to the maximum effective imaging range or the predetermined minimum imaging range of the image capture device is the largest among the plurality of captured images of the first reference pattern.

10. The image processing device according to claim 7, wherein:

the connecting unit is connected to a moving unit that moves the image capture device; and the controller controls the position of the image capture device being moved by the moving unit.

11. A non-transitory computer readable recording medium causing a computer to execute a process for processing an image, the process comprising:

acquiring an image captured by an image capture device, the image captured by the image capture device being an image of a first reference pattern that is projected by a projecting device, the first reference pattern indicating an effective projecting range of the projecting device;

converting frames of the first reference pattern from a first color to a second color;

changing a size of the color-converted first reference pattern based on a ratio between a maximum effective imaging range of the image capture device and the effective projecting range of the projecting device, the color-converted first reference pattern having the changed size being a second reference pattern;

and outputting the first reference pattern and the second reference pattern, the second reference pattern superimposed on the first reference pattern.

12. An image processing method comprising:

acquiring an image captured by an image capture device, the image captured by the image capture device being an image of a first reference pattern that is projected by a projecting device, the first reference pattern indicating an effective projecting range of the projecting device;

converting frames of the first reference pattern from a first color to a second color;

changing a size of the color-converted first reference pattern based on a ratio between a maximum effective imaging range of the image capture device and the effective projecting range of the projecting device, the color-converted first reference pattern having the changed size being a second reference pattern;

and outputting the first reference pattern and the second reference pattern, the second reference pattern superimposed on the first reference pattern.

13. An image processing device comprising:

a processor, the processor functioning as:

an acquiring unit that acquires a first reference pattern projected by a projecting device, the first reference pattern captured by a capturing device having an effective imaging range, the first reference pattern including frames having a first color and the first reference pattern indicating an effective projecting range of the projecting device;

a color converting unit that converts the frames having the first color to frames having a second color, the first reference pattern including the converted frames being a color converted reference pattern;

an enlarging/reducing unit that changes a size of the color converted reference pattern based on a ratio between a maximum of the effective projecting range of the image capture device and the effective projecting range of the projecting device, the color converted reference pattern having the changed size being a second reference pattern; and an output unit that outputs the first reference pattern and the second reference pattern to a display.

14. The image processing device according to claim 13, wherein the output unit superimposes the second reference pattern over the first reference pattern on the display.

* * * * *